S. S. SANDY.
FEEDING DEVICE FOR HAY PRESSES.
APPLICATION FILED APR. 16, 1915.
1,164,404.
Patented Dec. 14, 1915.
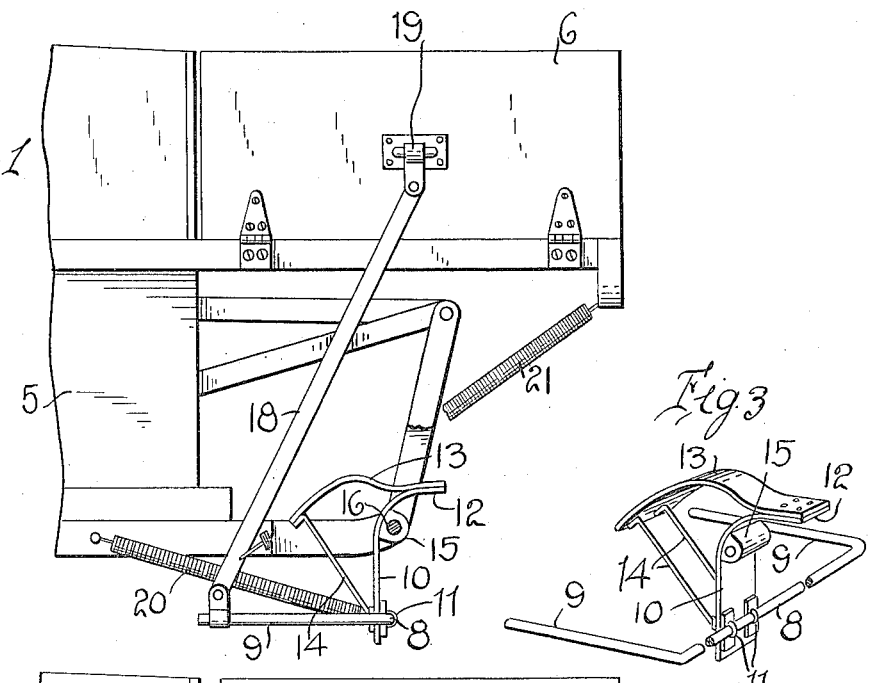
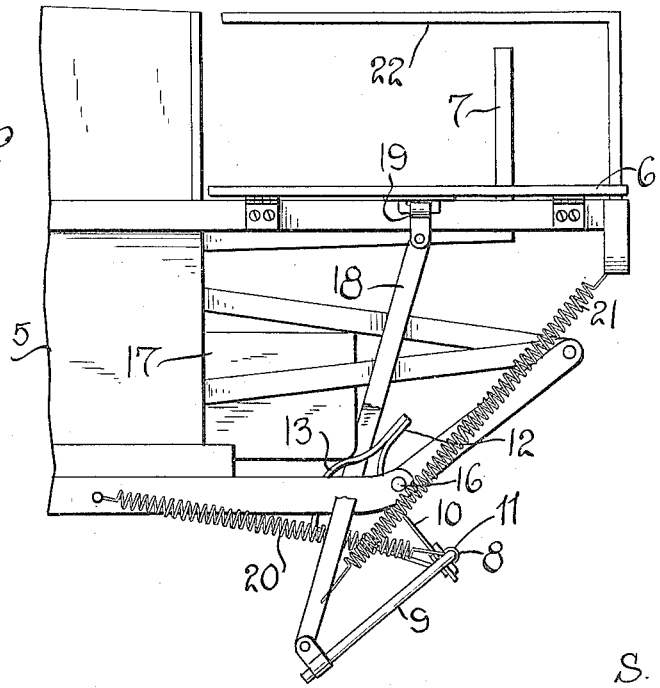
Inventor
S. S. SANDY
By Watson E. Coleman
Attorney

UNITED STATES PATENT OFFICE.

SAM S. SANDY, OF BOWIE, TEXAS.

FEEDING DEVICE FOR HAY-PRESSES.

1,164,404.  Specification of Letters Patent.  Patented Dec. 14, 1915.

Application filed April 16, 1915. Serial No. 21,820.

*To all whom it may concern:*

Be it known that I, SAM S. SANDY, a citizen of the United States, residing at Bowie, in the county of Montague and State of Texas, have invented certain new and useful Improvements in Feeding Devices for Hay-Presses, of which the following is a specification, reference being had to the accompanying drawings.

This invention relates to an improved feeding device for hay presses and has for its primary object to provide means whereby the feeding of hay to the baling chamber of the press may be greatly facilitated and the manual labor incident thereto minimized.

The invention has for a more particular object to provide a hay press feeder embodying a receiving platform including opposed hinged sections, means connected to said hinged sections and actuated by the movement of the plunger or presser head in one direction to dispose said sections in a substantially horizontal position to receive the hay, and means for returning said sections to their normal positions in the forward effective movement of the plunger, whereby the hay thereon is disposed in the path of a movable feeding member and discharged thereby into the baling chamber.

It is a further object of my invention to produce an automatically operating hay press feeder of the above character, which is simple in its construction, positive and reliable in operation and capable of use upon various types of hay presses now in common use.

With the above and other objects in view, my invention consists in the novel features of construction, combination, and arrangement of parts to be hereinafter more fully described, claimed, and illustrated in the accompanying drawing, in which, Figure 1 is a side elevation, several of the parts being broken away, showing the parts in their normal positions; Fig. 2 is a similar view showing the movable platform sections in their lowered position and the presser head or plunger at the end of its outward stroke; and Fig. 3 is a detail perspective view of the rock shaft and the means thereon for engagement by the plunger.

Referring in detail to the drawing, 5 indicates the rear end of a hay press of any ordinary or approved type. The body of this press is provided with a rearwardly extending platform which includes the two hingedly mounted wings or side sections 6, between which the longitudinally movable feeding member 7 is arranged and mounted in any preferred manner. This feeding member may be actuated by suitable mechanism such as is now commonly employed in the art. At the forward end of the hay receiving platform, the body of the press is provided with the usual baling chamber into which the hay is delivered.

My improved feeding device includes the rock shaft, indicated at 8, which is provided at its ends with the forwardly extending arms 9. This rock shaft is transversely disposed, and to the central portion thereof, one end of a plate 10 is rigidly fixed by means of the clip bolts 11. The other end of this plate is curved, as shown at 12, and to the same, one end of a second longitudinally curved plate 13 is riveted or otherwise securely fixed. Brace rods 14 connect the other end of this latter plate to the fixed end of the plate 10. The plate 10, intermediate of its ends, has a bearing sleeve or yoke 15 fixed thereon which is mounted to rock or turn upon a bolt 16 which connects spaced link elements of the plunger actuating mechanism. The plunger is indicated at 17 and it will be observed that the plate 13 is of such curvature that a portion thereof normally projects above the plane of the lower face of said plunger.

To the extremities of the forwardly extending arms 9 of the rock shaft, the lower ends of the bars 18 are loosely connected, while the upper ends of said bars are loosely connected to the respective hinged platform sections 6, as indicated at 19. A pair of coil springs 20 have one of their ends attached to the shaft 8, the forward ends of said springs being suitably secured to the body of the press. Additional coil springs, indicated at 21, are also connected at one of their ends to the lower ends of the respective bars 18 and have their other ends suitably secured to the rear end of the platform structure of the press.

In the operation of my invention, assuming that the several parts are in their normal positions, as shown in Fig. 1, in the rearward movement of the plunger 17 out of the baling chamber, said plunger will strike upon the curved plate 13 and force the same downwardly, thereby rocking the plate 10 upon the supporting bolt 16 and also forcing the shaft 8 downwardly. The bars 18, connected to the arms of this shaft, are thus pulled downwardly, and the hinged sections 6 of the platform are swung outwardly into approximately horizontal positions. The hay is now placed upon these platform sections forwardly of the feeding member 7. Upon the start of the inward movement of the plunger 17, the same moves out of contact with the plate 13 so that the springs 20 and 21, by their contractile action, return the parts to their normal positions and force the bars 18 upwardly, thus also moving the hinged platform sections 6 to substantially vertical positions and doubling the hay straws upon themselves in front of the feeding member 7. A longitudinally disposed rod or bar, indicated at 22, is arranged above this feeding member and acts to compress the straw and prevent the same being thrown off of the platform in the inward movement of the hinged sections 6 thereof. The movable feeding member 7 now carries the hay forwardly and discharges the same into the baling chamber in advance of the forwardly moving plunger so that the hay will be compressed into a bale.

From the foregoing description, taken in connection with the accompanying drawing, it will be seen that I have produced a very reliable, serviceable and efficient automatic feeding device for hay presses, whereby the operator is relieved of considerable labor. The hay may be fed upon the hinged platform sections from either side of the machine, and the services of an additional man to properly arrange the hay in advance of the movable feeding member may be dispensed with. The several parts of the device are of exceedingly simple form, and it will, therefore, be appreciated that the device is highly durable in actual use and may be readily applied to various makes of hay presses now upon the market.

While I have shown and described the preferred construction and arrangement of the several elements employed, it is to be understood that the device is, nevertheless, susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

1. The combination with a hay press including a plunger, of opposed movable platform sections upon which the hay is adapted to be placed, and a bodily movable element operatively connected to the platform sections and actuated by the plunger in its movement in one direction to dispose the hay in position to be fed to the baling chamber of the press.

2. The combination with a hay press including a plunger, of opposed hinged platform sections, and spring held means connected to said platform sections and actuated in the movement of the plunger in one direction to move the platform sections and dispose the hay thereon in position to be fed to the baling chamber of the press.

3. The combination with a hay press including a plunger, of opposed movably mounted hay receiving platform sections, a pivotally mounted member, and a bodily movable element carried by said member and operatively connected to the platform sections, said member being engaged and actuated by the plunger in its movement in one direction whereby the hay is disposed in position to be fed to the baling chamber of the press.

4. The combination with a hay press including a plunger, of movably mounted hay receiving platform sections, a bodily movable element arranged beneath the plunger and actuated thereby in the movement of the plunger in one direction, connections between said element and the movable platform sections to move the latter and dispose the hay thereon in position to be fed to the baling chamber, and means for returning said element to its normal position in the reverse movement of the plunger.

5. The combination with a hay press including a plunger, of movably mounted hay receiving platform sections, a bodily movable element arranged beneath the plunger and actuated thereby in the movement of the plunger in one direction, connections between said element and the movable platform sections to move the latter and dispose the hay thereon in position to be fed to the baling chamber, and a plurality of springs connected to said element to return the same to its normal position in the reverse movement of the plunger.

6. The combination with a hay press including a plunger, of movable hay receiving platform sections, a transversely disposed shaft arranged below the plunger, a plate fixed to the shaft and mounted for rocking movement, said plate having a portion disposed in the path of movement of the plunger, connections between said shaft and the movable platform sections whereby said sections are moved upon the engagement of the plunger with said plate in the movement of the plunger in one direction to dispose the hay on said platform sections in position to be fed to the baling chamber, and a plurality of springs acting to return said shaft and the plate to their normal position in the reverse movement of the plunger.

In testimony whereof I hereunto affix my signature in the presence of two witnesses.

SAM S. $\overset{\text{his}}{\times}$ SANDY.
mark

Witnesses:
 A. E. THOMAS,
 A. L. THEISEN.

Copies of this patent may be obtained for five cents each, by addressing the "Commissioner of Patents, Washington, D. C."